Feb. 9, 1926.

E. W. SWARTWOUT 1,572,372

STEAM ENGINE VALVE GEAR

Filed Sept. 25, 1920

Attest:
D. Mitchell

Inventor:
Everett W. Swartwout
by Henry J. Lueke
Atty

Patented Feb. 9, 1926.

1,572,372

UNITED STATES PATENT OFFICE.

EVERETT W. SWARTWOUT, OF WHITE PLAINS, NEW YORK.

STEAM-ENGINE-VALVE GEAR.

Application filed September 25, 1920. Serial No. 412,745.

*To all whom it may concern:*

Be it known that I, EVERETT W. SWARTWOUT, a citizen of the United States of America, residing at White Plains, county of Westchester, State of New York, have invented certain new and useful Improvements in Steam-Engine-Valve Gears, of which the following is a specification.

This invention relates to valve gears for steam engines and the like.

An object of this invention is to provide improved means for operating the inlet valves of a steam engine such as of the uniflow type for controlling the instants of opening and of closing the valves and the extents of opening of the valves under varying loads and operating conditions.

In such type of steam engines, as uniflow steam engines, two inlet valves are usually employed, respectively disposed at or adjacent the opposite ends of the engine cylinder and under conditions of use the amount of steam admitted through the respective valves varies according to the work performed by the engine, and accordingly under the condition of high load, the average temperature of the steam in the cylinder is relatively raised thereby causing the cylinder to elongate and during the condition of low load the average temperature of the steam in the cylinder is relatively lowered and thereby causing the cylinder to contract.

Usually, the frame in which the engine shaft or crank shaft is supported, is secured to one end of the engine cylinder and accordingly such relative expansion and contraction of the cylinder causes the head or free end of the cylinder to undergo displacement relative to the frame end of the engine cylinder.

In accordance with this invention, the instants of opening and of closing of the inlet valves and the extents of opening of the inlet valves as regulated by any approved type of speed governor, are maintained notwithstanding such relative elongation and contraction of the engine cylinder.

In the more preferred forms of this invention, the speed governor, or equivalent, is mounted on the engine or crank shaft and the governor is connected by a suitable eccentric rod to a bell-crank, or equivalent, mounted to oscillate in a plane substantially parallel to the direction of length of the engine cylinder; one inlet valve is operated by the bell-crank by means of a link directly connecting such bell-crank with the movable valve member of such inlet valve, and the other inlet valve is controlled by a lay shaft extending substantially parallel to the longitudinal axis of the engine cylinder, and mounted on the casing of the engine cylinder and slidable in the direction of the length of the lay shaft relative to the cylinder, such lay shaft being oscillated by suitable universal connection between the arm carried by the lay shaft and an arm of the bell crank.

Further features and objects of the invention will be more fully understood from the following description and the accompanying drawings, in which Fig. 1 is a side elevation showing diagrammatically a uniflow engine embodying my invention;

Fig. 2 is a detail perspective view of a preferred form of the control and operating mechanism shown in Fig. 1;

Fig. 3 is a detail vertical sectional elevation of the lay shaft of the control mechanism of Fig. 1;

Fig. 4 is a detail sectional elevation on line 4—4 of Fig. 3;

Fig. 5 is a detail sectional elevation on line 5—5 of Fig. 3; and

Fig. 6 is a detail vertical sectional view of the inlet valves indicated in Fig. 1.

Figure 1:
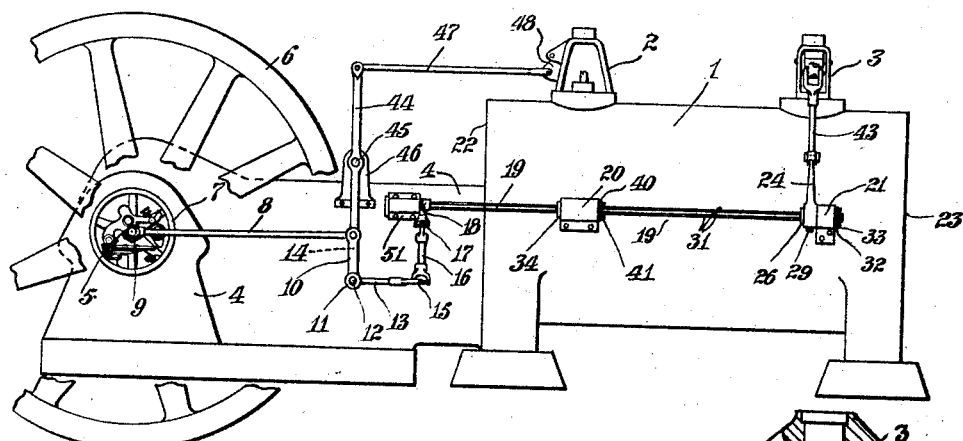
Figure 1:
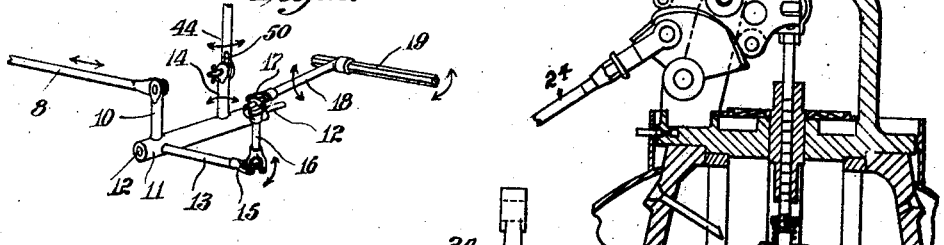
Figure 1:
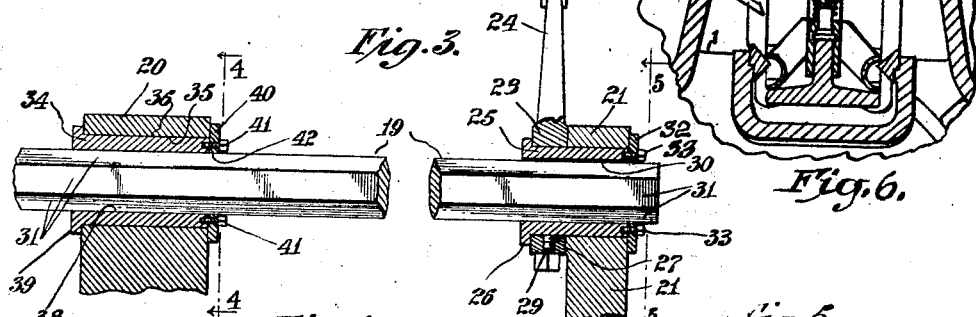
Figure 1:
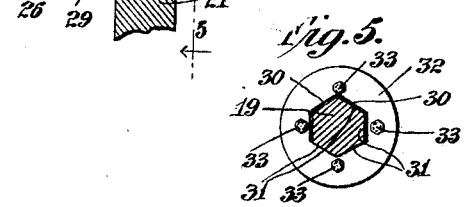
Figure 1:
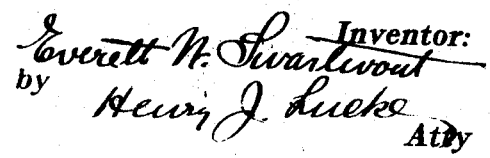

The uniflow engine, see Fig. 1, is shown of conventional type and provided with any approved type of inlet valves 2, 3, a frame 4 and a crank shaft 5. The flywheel is shown at 6. The speed governor, 7, coacting with the fly wheel 6 is of any approved construction, such as the centrifugal, or inertia or combination centrifugal and inertia or other standard type. The eccentric rod 8 is connected in the usual way with the eccentric element 9 of the speed governor 7 and at its opposite end with the arm 10 of the bell crank 11, see Fig. 2.

The bell-crank 11 is pivoted at 12 at one side of the frame of the engine and preferably the pivot pin 12 extends in a direction substantially perpendicular to the longitudinal axis of the engine cylinder 1. The bell crank 11 as shown comprises three arms, namely the aforesaid arm 10, the arm 13 and the arm 14. The arm 13 is provided at its free end with the universal joint or connection 15 connecting with the link 16, the opposite end of the link 16 being connected through the universal joint or connection 17 with the arm 18 fixed to the lay shaft 19. The lay shaft 19 extends substantially parallel to the longitudinal axis of the engine cylinder 1 and is mounted in the spaced bearings 20, 21, see also Figs. 4 and 5, respectively positioned directly on the outer casing of the engine cylinder 1.

The bearing 20 is usually positioned adjacent the frame end 22 of the engine cylinder 1 or on the frame 4 at 51 near the link 18, and the bearing 21 positioned adjacent the head end 23 of the engine cylinder 1.

The oscillating arm 24 controlling the inlet valve 3 is connected to the lay shaft 19 by means of the collar 25 to which the arm 24 is outwardly held by means of the outer flange 26 of the collar 25 and inwardly held by the lateral face 27, of the bearing 21. The inner face of the hub 28 of the collar 24 is circular as is also the outer face of the collar 25 and the arm 24 is adjustably positioned on the collar 25 by means of the set screw 29. The inner face 30 of the collar 25 is polygonal such as hexagonal or the like, and conforming to the outer face 31 of the lay shaft 19, the cross section of the polygonal face 30 of the collar 25 being slightly larger than the cross section area of the lay shaft 19 to permit displacement of the lay shaft 19 relative to the bearing 21, as will appear more fully hereinafter. The collar 25 is positioned by means of the plate 32 adjustably secured to the collar 25 by means of the set nuts 33.

The collar 34 of the bearing 20 is provided with an outer face of circular contour 35 conforming to the inner face 36 of the bearing 21, similar to the collar 25 relative to the bearing 21 and similarly the inner face 38 of the collar 34 conforms to the polygonal contour of the outer face of the lay shaft 19, the cross section of the collar 34 being substantially equal to the cross section of the lay shaft 19 to cause a tight fit between the collar 34 and the lay shaft 19. The collar 34 is positioned on the bearing 20 by means of the outer flange 39 of the collar 34 and the positioning plate 40 having the adjustable set nuts 41. If desired, the cross section of the face 38 of the collar 34 may be slightly larger than the cross section of the polygonal faces of the lay shaft 19 and the lay shaft 19 retained in position relative to the bearing 20 by providing the inner polygonal face 42 of the retaining plate 40 of substantially coincident cross section with that of the outer face of the lay shaft 19.

The oscillating arm 24 is connected with the movable element of the valve 3 by means of the link 43.

The movable valve element of inlet valve 2 is controlled by the arm 14 of the bell crank 11 through the lever 44 pivoted at 45 to a suitable bracket 46 attached to the frame 4 and the link 47 connecting the lever 44 with the arm 48 of the movable element of the inlet valve 2.

Under the condition of increased load, whereby the engine shaft is relatively retarded, and thereby retarding the fly wheel 6, the speed governor 7 actuates its eccentric 9 to operate the eccentric rod 8 to cause the uniflow inlet valves 2, 3, to acquire a relatively earlier instant of opening and a relatively longer period of extent of opening, under which condition of increased load, the increased volume of steam passing through the engine cylinder 1 raises the temperature of the engine cylinder 1, thereby elongating the cylinder and in the form of the engine shown, resulting in causing the head end 23 of the engine cylinder 1 to be displaced a greater distance from the frame end 22 of the cylinder 1, likewise causing the bearing 21 and the valve 3 to be moved away from the bearing 20. However, notwithstanding such displacement of the opposite ends of the engine cylinder, the lay shaft 19 being retained against displacement in the direction of its length relative to the bearing 20, as aforesaid, is permitted to be displaced in the direction of its length relative to the bearing 21 by means of the clearance between the outer contour 31 of the lay shaft and positioning plate 32.

Under the condition of low load, the relatively decreased volume of steam passing through the engine cylinder 1 causes the same to be relatively contracted whereby the head end 23 of the cylinder 1 approaches the frame end 22, and likewise the bearing 21, the valve 3 and the operating mechanism 24, 43, to approach the bearing 20, but notwithstanding the lay shaft 19 is permitted to be displaced relatively to its bearing 21 but retained relatively to its bearing 20.

The practical extent of displacement of the valve 2 relative to the pivotal center of the bracket 11 during such stages of contraction and elongation of the engine cylinder 1 is substantially nil, and for this reason the bracket 11 is connected with the movable valve element of the inlet valve 2 by means of the lever 44 and link 47, as aforesaid. It will be noted that the lever 44 is connected with the arm 14 by a pin and slot connection 50 to provide for angular movement of the arm 14 relatively to the lever 44. During the periods of operation of the eccentric rod 8 by the eccentric 9 of the speed governor 7, the bell-crank 11 is oscillated, thereby oscillating its arm 13, link 16, arm 18, and thereby the lay shaft 19 and by reason of the polygonal engagement between the lay shaft 19 and the collar 24 is correspondingly oscillated to properly control the movable valve elements of the inlet valve 3, to provide for the rate of inflow of the steam therethrough, and thereby maintain the speed of the engine substantially constant, in which operation the movable element of the inlet valve 2 is correspondingly operated by the arm 14 through the lever 44 and link 47 as aforesaid.

In Fig. 6, I have indicated one form of approved type of an inlet valve for the cylinder 1, and as an illustration, I have shown the inlet valve 3 operated by its oscillating arm 24.

It will be understood that the proper adjustments for the initial setting of the movable elements of the inlet valves 2, 3, relative to the eccentric member 9 of the speed governors 7 are provided in accordance with well known practice.

Whereas I have described my invention by reference to specific forms thereof, it will be understood that many changes and modifications may be made without departing from the spirit of the invention, as defined by the appended claims.

I claim.

1. The combination with an engine provided with a cylinder, a plurality of inlet valves for said cylinder, a frame, a crankshaft carried by said frame and a governor mounted on said crank-shaft, one of said valves being disposed adjacent said frame and the other of said valves disposed remotely from said frame, of oscillating means operated by said governor, means directly connecting said oscillating means with said one valve, an arm for oscillating said other valve and separate connecting means connecting said oscillating means with said arm, said other valve, and means for mounting said separate connecting means on said cylinder and for operatively connecting said arm relative to said separate connecting means for maintaining the angular operation of said separate connecting means relative to said arm independently of the variations of the length of the cylinder due to variations of temperature and the consequent variation of displacement of said one inlet valve relative to said other inlet valve.

2. The combination with an engine provided with a cylinder, a plurality of inlet valves for said cylinder, a frame, a crank shaft carried by said frame and a governor mounted on said crank shaft, one of said valves being disposed adjacent said frame and the other of said valves disposed remotely from said frame, of oscillating means operated by said governor, means directly connecting said oscillating means with said one valve and separate means connecting said oscillating means with said other valve, said separate connecting means including an oscillatory shaft and an arm oscillated by said oscillatory shaft, and means for mounting said oscillatory shaft on said cylinder to permit the displacement of said oscillatory shaft relative to said oscillated arm incident to the expansion and contraction of said cylinder under varying temperature conditions, said separate connecting means further including a connection between said arm and said oscillatory shaft to afford the displacement of said oscillatory shaft relative to said arm in the direction of length of said oscillatory shaft without varying the angular relation between said arm and said oscillatory shaft.

3. The combination with an engine provided with a cylinder, a plurality of inlet valves for said cylinder, a frame, a crank shaft carried by said frame and a governor mounted on said crank shaft, one of said valves being disposed adjacent said frame and the other of said valves disposed remotely from said frame, of oscillating means operated by said governor, means directly connecting said oscillating means with said one valve and separate means connecting said oscillating means with said other valve, said separate connecting means including an oscillatory shaft and an arm oscillated by said oscillatory shaft, and means for mounting said oscillatory shaft on said cylinder to permit the displacement of said oscillatory shaft relative to said oscillated arm incident to the expansion and contraction of said cylinder under varying temperature conditions, said mounting means comprising a bearing carried by said cylinder and a collar mounted in said bearing, said collar having a sliding fit with said oscillatory shaft, said separate connecting means further including a connection between said arm and said oscillatory shaft to afford the displacement of said oscillatory shaft relative to said arm in the direction of length of said oscillatory shaft without varying the angular relation between said arm and said oscillatory shaft.

4. The combination with an engine provided with a cylinder, a plurality of inlet valves for said cylinder, a frame, a crank shaft carried by said frame and a governor mounted on said crank shaft, one of said valves being disposed adjacent said frame and the other of said valves disposed remotely from said frame, of oscillating means operated by said governor, means directly connecting said oscillating means with said one valve and separate means connecting said oscillating means with said other valve, said separate connecting means including an oscillatory shaft and an arm oscillated by said oscillatory shaft, and means for mounting said oscillatory shaft on said cylinder to permit the displacement of said oscillatory shaft relative to said oscillated arm incident to the expansion and contraction of said cylinder under varying temperature conditions, said mounting means comprising a bearing carried by said cylinder and a collar mounted in said bearing, said collar having a sliding fit with said oscillatory shaft, and further comprising a bearing, a collar mounted in said second-named bearing and having a tight fit with said oscillatory shaft, said separate connecting means further including a connection between said arm and said oscillatory shaft to afford the displacement of said oscillatory shaft relative to said arm in the direction of length of said oscillatory shaft without varying the angular relation between said arm and said oscillatory shaft.

5. The combination of a uniflow engine provided with two materially spaced inlet valves, a lay shaft extending substantially parallel to the axis of the engine cylinder, a plurality of materially spaced bearings, a collar in fixed relation to said lay shaft and rotatably mounted in one of said bearings, a second collar in variable relation to said lay shaft in its direction of length and rotatably mounted in the other of said bearings, an arm carried by said lay shaft and operating one of said valves, rocking means, pivotal means for said rocking means extending substantially perpendicular to the axis of said engine cylinder, universal connecting means between one arm of said rocking means and said lay shaft, operating means connecting the other of said inlet valves with said rocking means, a governor mounted on the shaft of said engine and an eccentric rod connecting said governor with said rocking means, without varying the functional relation of the lay shaft to the valves or the governor.

In testimony whereof I have signed this specification this 20th day of September, 1920.

EVERETT W. SWARTWOUT.